US012763583B2

(12) United States Patent
Howard et al.

(10) Patent No.: US 12,763,583 B2
(45) Date of Patent: Oct. 13, 2026

(54) SYSTEM AND METHOD FOR PROTECTING GRID-FORMING INVERTER BASED RESOURCES FROM POWER DEVIATIONS

(71) Applicant: GE Infrastructure Technology LLC, Greenville, SC (US)

(72) Inventors: Dustin F. Howard, Brookhaven, GA (US); Ignacio Vieto Miranda, Warwick, RI (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 144 days.

(21) Appl. No.: 18/906,864

(22) Filed: Oct. 4, 2024

(65) Prior Publication Data

US 2026/0100586 A1 Apr. 9, 2026

(51) Int. Cl.

*H02J 3/38* (2026.01)
*H02J 3/388* (2026.01)
*H02J 101/28* (2026.01)

(52) U.S. Cl.

CPC .............. *H02J 3/381* (2013.01); *H02J 3/388* (2020.01); *H02J 2101/28* (2026.01)

(58) Field of Classification Search

CPC .................................. H02J 3/381; H02J 3/388
See application file for complete search history.

(56) References Cited

U.S. PATENT DOCUMENTS 5,798,633 A 8/1998 Larsen et al.
9,270,194 B2 2/2016 Brogan et al.
(Continued)

FOREIGN PATENT DOCUMENTS

CN 116 191 557 A 5/2023
WO WO 2024/091246 A1 5/2024
(Continued)

OTHER PUBLICATIONS

EPO Search Report, Mar. 16, 2026.

*Primary Examiner* — Scott Bauer
(74) *Attorney, Agent, or Firm* — Dority & Manning, P.A.

(57) ABSTRACT

A method for protecting a grid-forming inverter-based resource connected to a power grid from power deviations. The method includes receiving a first feedback signal for a first parameter. The first parameter being one of a power of the grid-forming inverter-based resource or an electrical frequency of the power grid. The method also includes determining a first parameter deviation signal based on a comparison between the first feedback signal and a threshold for the first parameter. Further, the method includes determining a scale factor configured to adjust sensitivity of at least one of a power or frequency protection for the grid-forming inverter-based resource based on a second parameter. The second parameter being another of the power of the grid-forming inverter-based resource or the electrical frequency of the power grid. Moreover, the method includes determining a compensated deviation signal based on the scale factor and the first parameter deviation signal. Furthermore, the method includes determining an accumulated deviation signal over time based on the compensated deviation signal. In addition, the method includes tripping the grid-forming inverter-based resource when the accumulated deviation signal exceeds a trip threshold.

20 Claims, 11 Drawing Sheets

(56) References Cited

U.S. PATENT DOCUMENTS

| | | | | |
|---|---|---|---|---|
| 12,448,948 | B1 * | 10/2025 | Couchman | F03D 7/0264 |
| 2010/0142237 | A1 | 6/2010 | Yuan et al. | |
| 2016/0134202 | A1 * | 5/2016 | Lu | H02J 3/381<br>363/123 |
| 2021/0327431 | A1 * | 10/2021 | Stewart | G06V 40/45 |
| 2022/0181883 | A1 | 6/2022 | Larsen et al. | |
| 2025/0106076 | A1 * | 3/2025 | Ahirwar | H04L 27/10 |
| 2025/0286384 | A1 * | 9/2025 | Gulzar | H02J 3/381 |

FOREIGN PATENT DOCUMENTS

| | | | |
|---|---|---|---|
| WO | WO 2024/091249 | A1 | 5/2024 |
| WO | WO 2024/167493 | A1 | 8/2024 |

* cited by examiner

SYSTEM AND METHOD FOR PROTECTING GRID-FORMING INVERTER BASED RESOURCES FROM POWER DEVIATIONS

FIELD

The present disclosure relates generally to inverter-based resources, such as wind turbines, and more particularly, to systems and methods for protecting grid-forming inverter-based resources from power deviations.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in variations in the grid voltage.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current.

Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in United States Publication No.: 2010/0142237 entitled "System and Method for Control of a Grid Connected Power Generating System," and U.S. Pat. No. 9,270,194 entitled "Controller for controlling a power converter." However, such implementations have been employed on full-converter wind generators.

A common challenge associated with grid-forming inverter-based resources is equipment overload and undesirable tripping due to grid transients. Severe grid events or operating conditions where the grid forming inverter-based resource is close to power/energy limits (e.g., low operating speed) may cause equipment overload. Severe equipment overload may also lead to equipment damage. As such, inverter-based resources may provide functionality to trip the inverter-based resource to reduce a likelihood or duration of equipment overload and likelihood of equipment damage. However, traditional protection functionality may not be sensitive enough to trip the inverter-based resource in certain grid conditions, such as blackstarting and islanding conditions, which can result in severe equipment overload if the load exceeds available power or equipment limitations. Additionally, traditional protection functionality may be overly sensitive to reverse powering of the inverter-based resource, which can result in undesirable tripping thereof.

In view of the foregoing, the present disclosure is directed to a system and method that avoids undesirable tripping and equipment overloads of an inverter-based resource.

BRIEF DESCRIPTION

Aspects and advantages of the invention will be set forth in part in the following description, or may be obvious from the description, or may be learned through practice of the invention.

In an aspect, the present disclosure is directed to a method for protecting a grid-forming inverter-based resource connected to a power grid from power deviations. The method includes receiving a first feedback signal for a first parameter. The first parameter being one of a power of the grid-forming inverter-based resource or an electrical frequency of the power grid. The method also includes determining a first parameter deviation signal based on a comparison between the first feedback signal and a threshold for the first parameter. Further, the method includes determining a scale factor configured to adjust sensitivity of at least one of a power or frequency protection for the grid-forming inverter-based resource based on a second parameter. The second parameter being another of the power of the grid-forming inverter-based resource or the electrical frequency of the power grid. Moreover, the method includes determining a compensated deviation signal based on the scale factor and the first parameter deviation signal. Furthermore, the method includes determining an accumulated deviation signal over time based on the compensated deviation signal. In addition, the method includes tripping the grid-forming inverter-based resource when the accumulated deviation signal exceeds a trip threshold.

In another aspect, the present disclosure is directed to a wind farm. The wind farm includes a plurality of wind turbines capable of being connected to a power grid via a transmission network. The wind farm also includes a controller comprising at least one processor configured to perform a plurality of operations, the plurality of operations, including but not limited to receiving a first feedback signal for a first parameter, the first parameter being one of a power of the grid-forming inverter-based resource or an electrical frequency of the power grid; determining a first parameter deviation signal based on a comparison between the first feedback signal and a threshold for the first parameter; determining a scale factor configured to adjust sensitivity of at least one of a power or frequency protection for the grid-forming inverter-based resource based on a second parameter, the second parameter being another of the power of the grid-forming inverter-based resource or the electrical frequency of the power grid; determining a compensated deviation signal based on the scale factor and the first parameter deviation signal; determining an accumulated deviation signal over time based on the compensated deviation signal; and tripping the grid-forming inverter-based resource when the accumulated deviation signal exceeds a trip threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
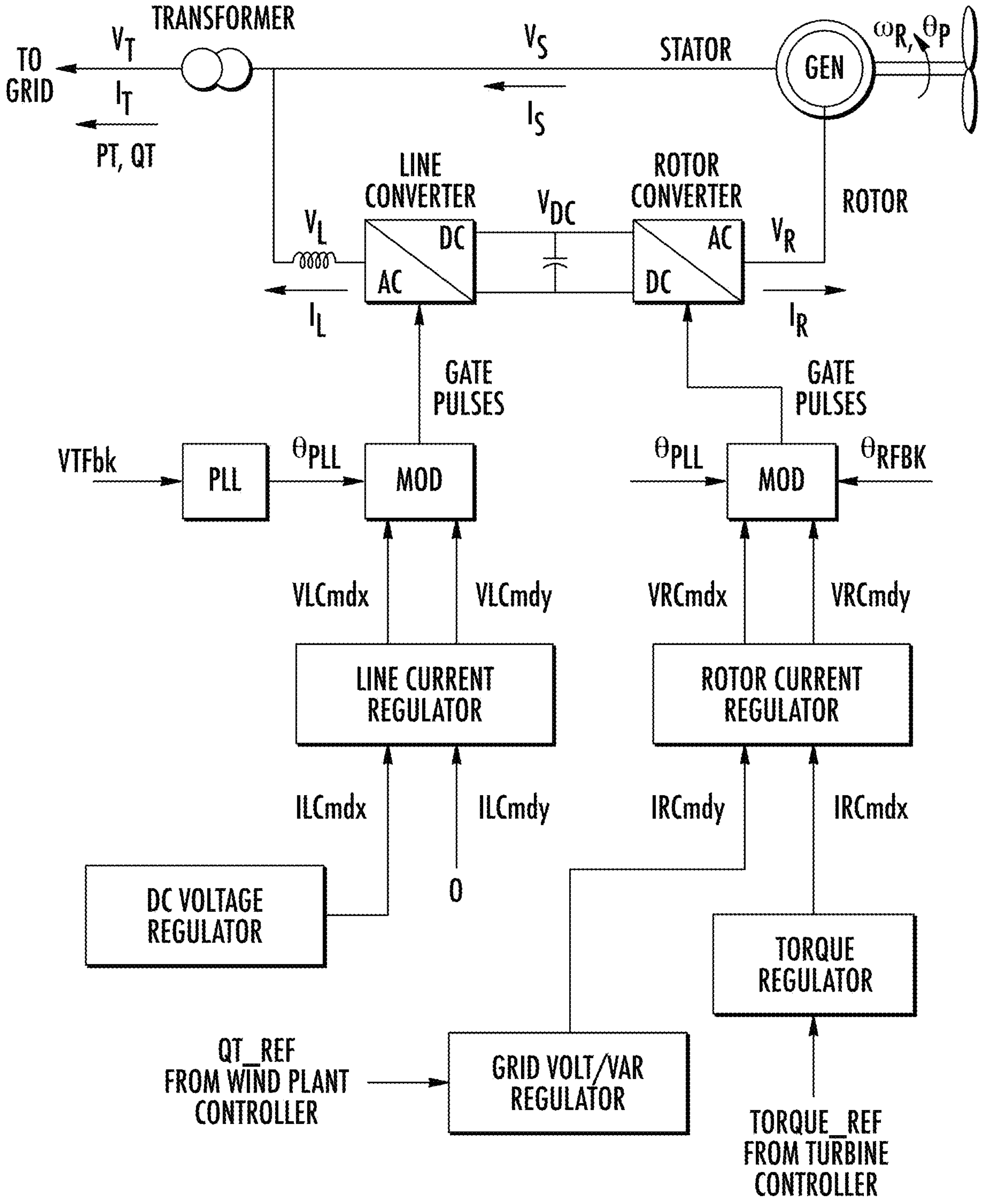
FIG. 1 PRIOR ART
FIG. 1 illustrates a one-line diagram of a double-fed wind turbine generator with structure of converter controls for grid-following application according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A grid-forming (GFM) inverter-based resource (IBR), such as a wind turbine, receives electrical feedbacks and control signals, such as voltage feedbacks, frequency feedbacks (e.g., from the phase-locked loop (PLL)), and a power feedback signal. GFM wind turbines typically have control functions that trip the wind turbine based on the power feedback signal exceeding a maximum power threshold or falling below a minimum power threshold to avoid excessive equipment overload. For example, the power feedback signal may exceed the maximum power threshold during grid conditions where loads exceed available generation, which may more likely occur in conditions such as black-starting and/or islanding conditions. As another example, the power feedback signal may fall below the minimum power threshold when a sudden trip of a large load in the system leads to excessive generation in the electrical network. However, such control functions determine whether to trip the wind turbine without regard to power grid conditions, which can cause undesirable tripping and/or excessive equipment overloading of the wind turbine. For example, the control functions may be overly sensitive to the power feedback signal falling below the minimum power threshold and/or may be insufficiently sensitive to the power feedback signal exceeding the maximum power threshold.

In view of the foregoing, the present disclosure is directed to systems and methods for protecting an IBR from power deviations. In particular, systems and methods of the present disclosure include adjusting a sensitivity of trip timing for an IBR based on a power signal and a scale factor. The scale factor is determined based on electrical frequency of the power grid to avoid excessive equipment overloading or undesirable tripping. The power signal may be processed, for example, through filtering or projection in time.

Figure 2:
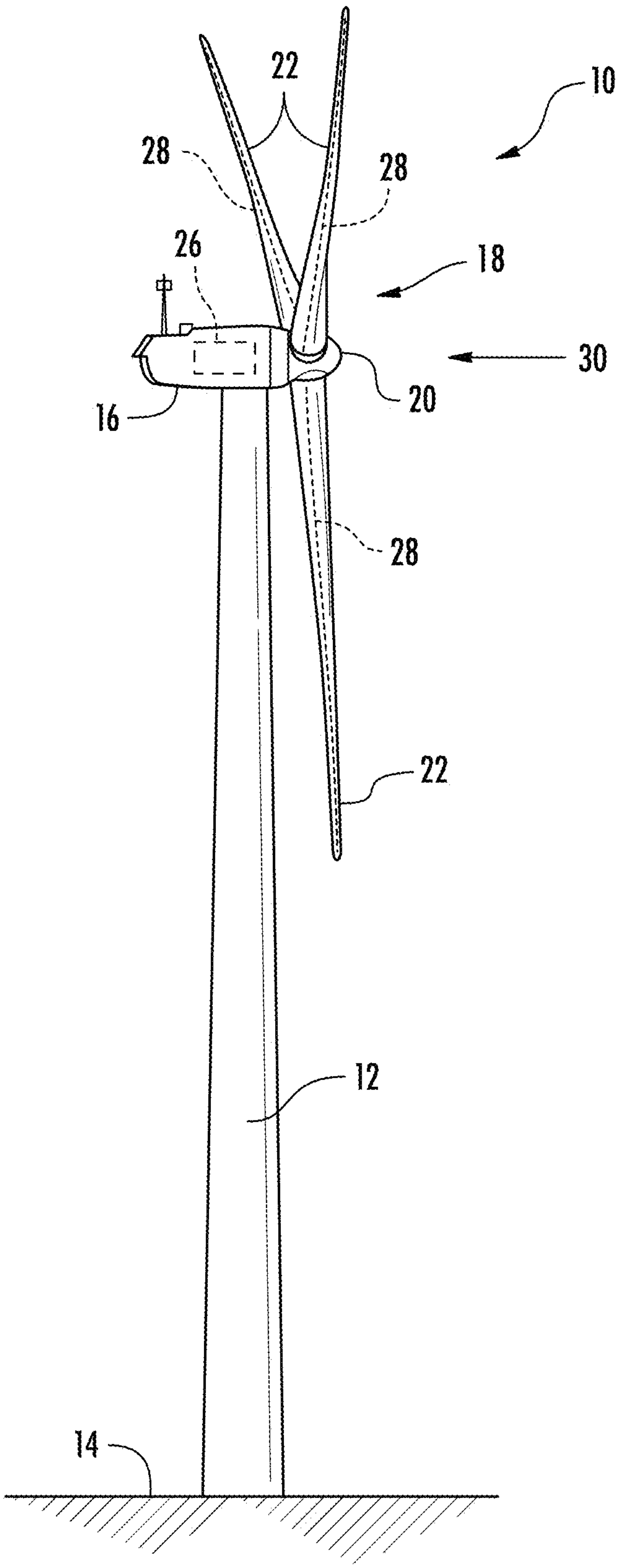
FIG. 2 illustrates a perspective view of an embodiment of a wind turbine according to the present disclosure.

Referring now to the drawings, FIG. 2 illustrates a perspective view of an embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 3:
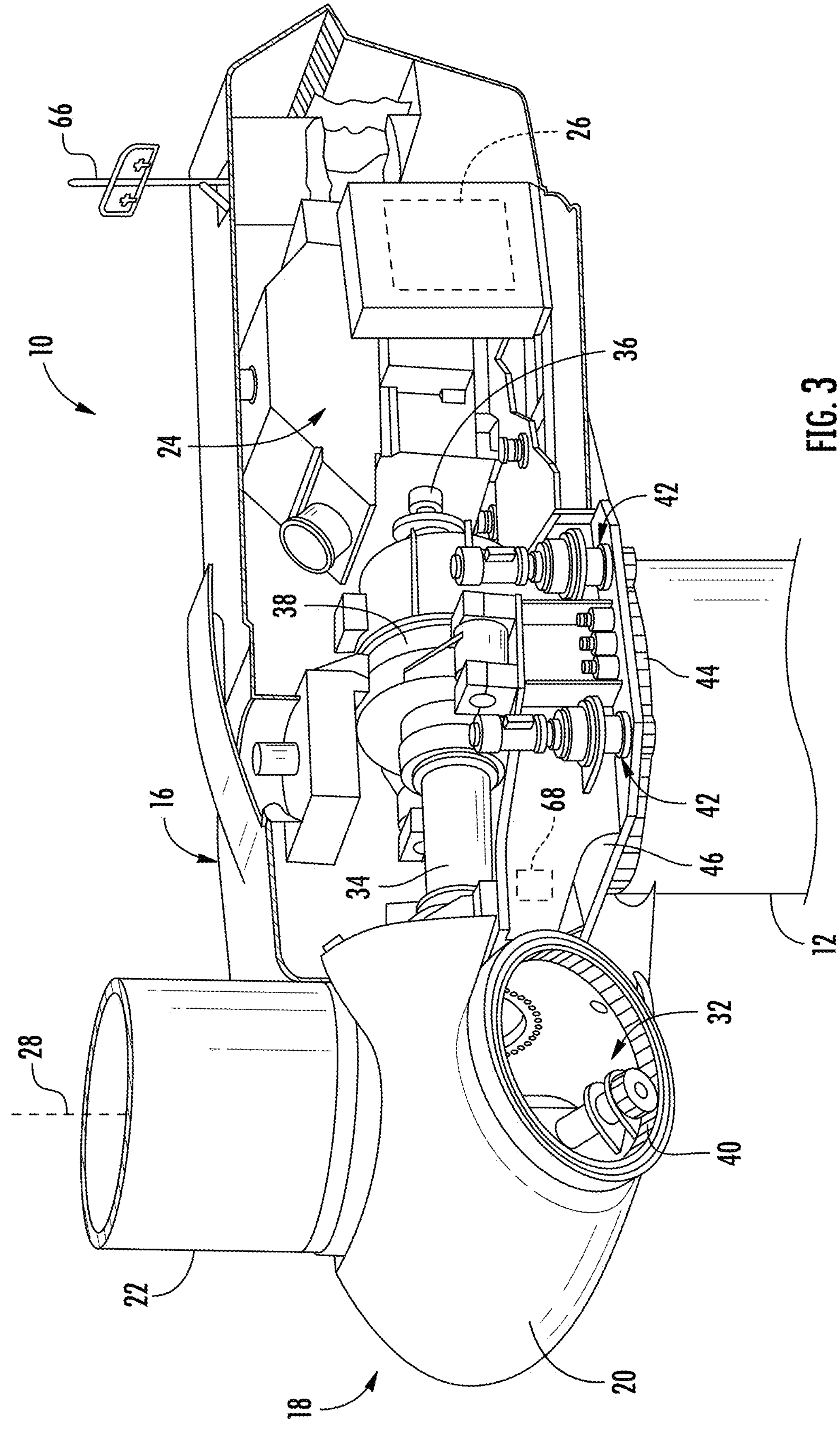
FIG. 3 illustrates a simplified, internal view of an embodiment of a nacelle according to the present disclosure.

Referring now to FIG. 3, a simplified, internal view of an embodiment of the nacelle 16 of the wind turbine 10 shown in FIG. 2 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, light detection and ranging devices, sonic detection and ranging devices, anemometers, wind vanes, barometers, radio detection and ranging devices or any other sensing device which can provide wind directional information now known or later developed in the art. Still further sensors 68 may be utilized to measure additional operating parameters of the wind turbine 10, such as voltage, current, vibration, etc. as described herein.

Figure 4:
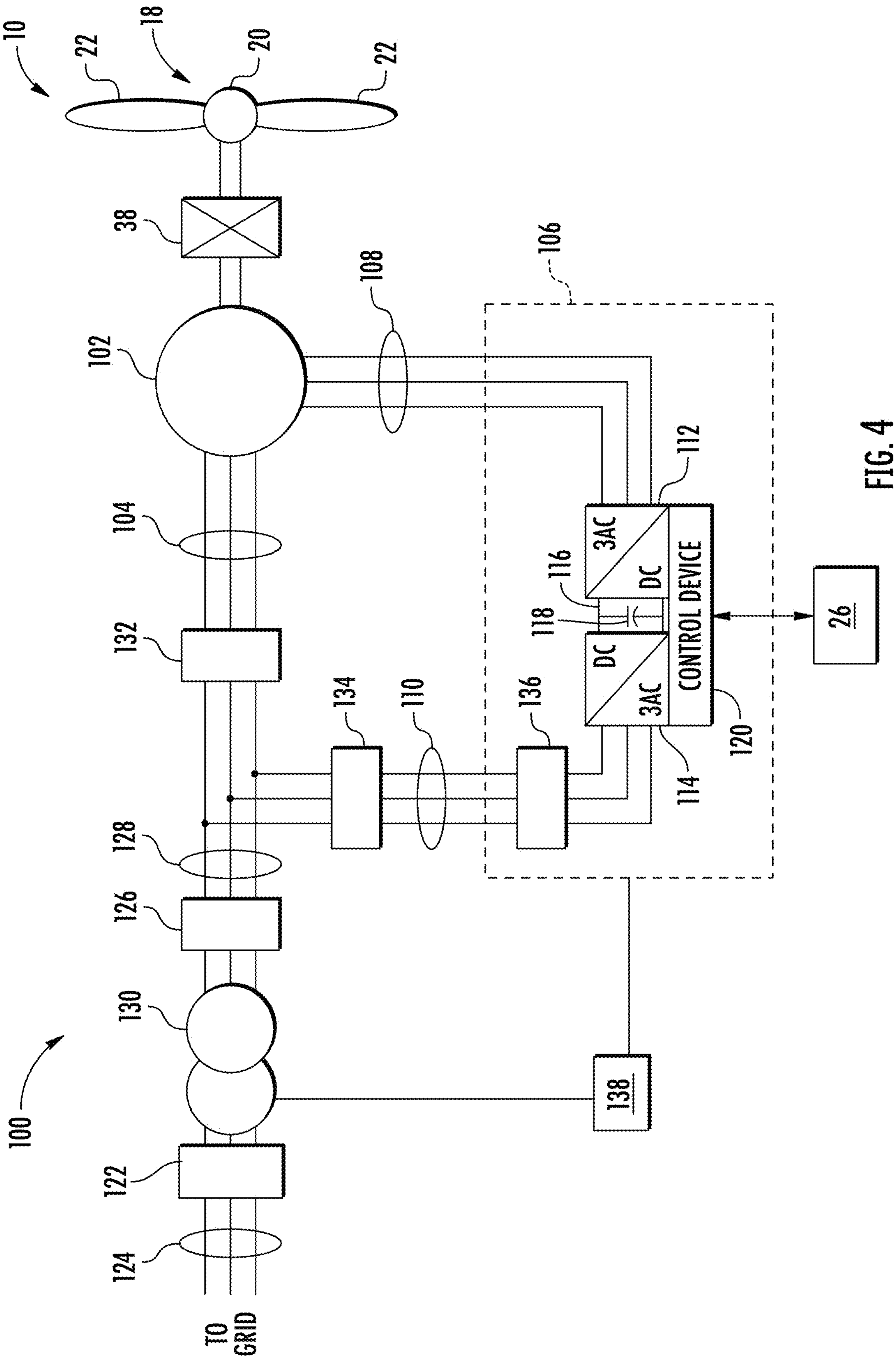
FIG. 4 illustrates a schematic view of an embodiment of a wind turbine electrical power system suitable for use with the wind turbine shown in FIG. 1.

Referring now to FIG. 4, a schematic diagram of an embodiment of a wind turbine power system 100 is illustrated in accordance with aspects of the present disclosure. Although the present disclosure will generally be described herein with reference to the system 100 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 4 and as mentioned, the rotor 18 of the wind turbine 10 (FIG. 2) may, optionally, be coupled to the gearbox 38, which is, in turn, coupled to a generator 102, which may be a doubly fed induction generator (DFIG). As shown, the generator 102 may be connected to a stator bus 104. Further, as shown, a power converter 106 may be connected to the generator 102 via a rotor bus 108, and to the stator bus 104 via a line side bus 110. As such, the stator bus 104 may provide an output multiphase power (e.g., three-phase power) from a stator of the generator 102, and the rotor bus 108 may provide an output multiphase power (e.g., three-phase power) from a rotor of the generator 102. The power converter 106 may also include a rotor side converter (RSC) 112 and a line side converter (LSC) 114. The generator 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the generator 102 during connection to and disconnection from a load, such as the power grid 124. For example, a system circuit breaker 126 may couple a system bus 128 to a transformer 130, which may be coupled to the power grid 124 via the grid breaker 122. In alternative embodiments, fuses may replace some or all of the circuit breakers.

In operation, alternating current power generated at the generator 102 by rotating the rotor 18 is provided to the power grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the power grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of generator 102 to provide multi-phase power (e.g., three-phase power) having a frequency maintained substantially at the frequency of the power grid 124 (e.g., 50 Hz or 60 Hz).

Additionally, various circuit breakers and switches, such as grid breaker 122, system circuit breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system via the converter controller 120. The control signals may be based, among other things, on sensed states or operating characteristics of the wind turbine power system 100. Typically, the control signals provide control of the operation of the power converter 106. For example, feedback in the form of a sensed speed of the generator 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled, and the electrical stator frequency is substantially independent of the mechanical rotor speed.

Under some states, the bi-directional characteristics of the power converter 106, and specifically, the bi-directional characteristics of the LSC 114 and RSC 112, facilitate feeding back at least some of the generated electrical power into the generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator active and reactive power control, or other controls, are facilitated by controlling rotor current and voltage.

Figure 5:
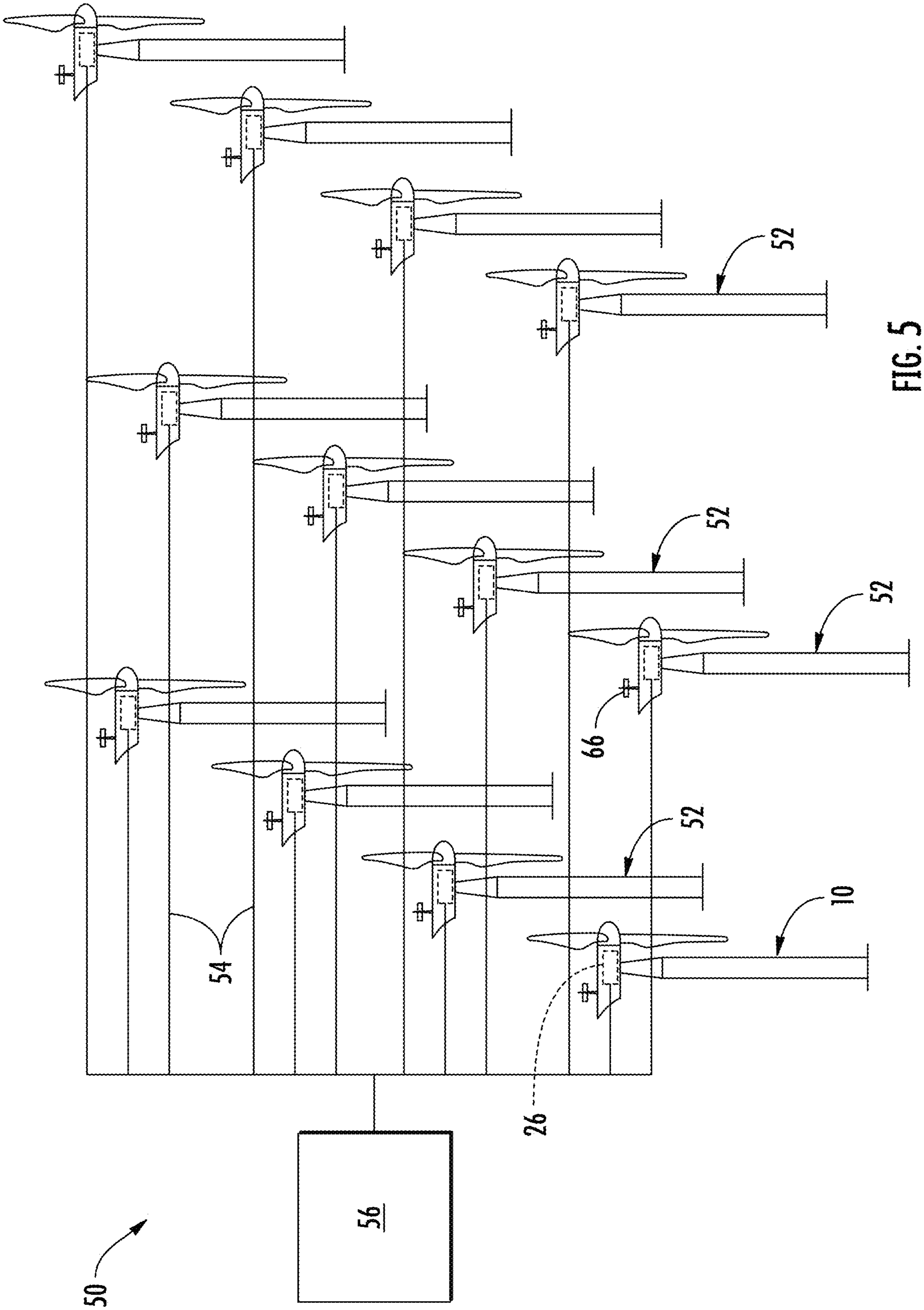
FIG. 5 illustrates a schematic view of an embodiment of a wind farm having a plurality of wind turbines according to the present disclosure.

Referring now to FIG. 5, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In an embodiment, the turbine controllers of the plurality of wind turbines 52 are communicatively coupled to the farm-level controller 56, e.g., through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands or voltage reference commands across the wind turbines 52 of the wind farm 50.

Figure 6:
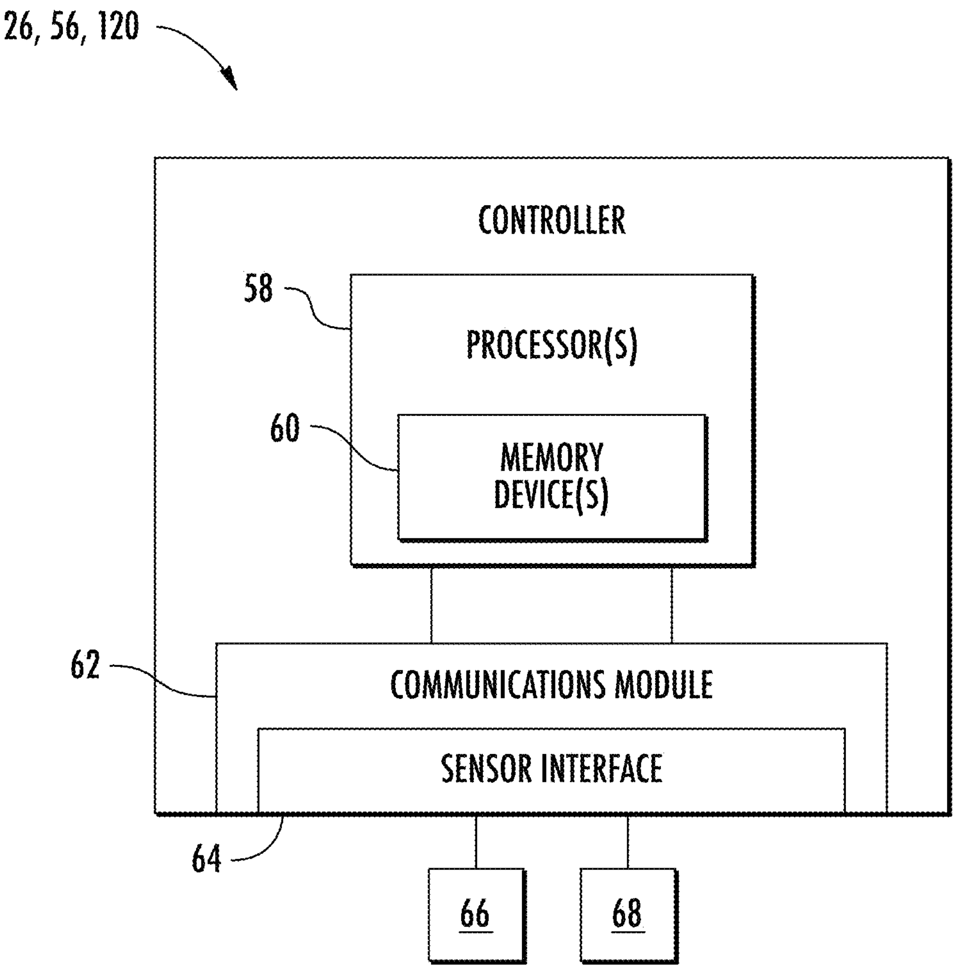
FIG. 6 illustrates a block diagram of an embodiment of a controller according to the present disclosure.

Referring now to FIG. 6, a block diagram of an embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 7:
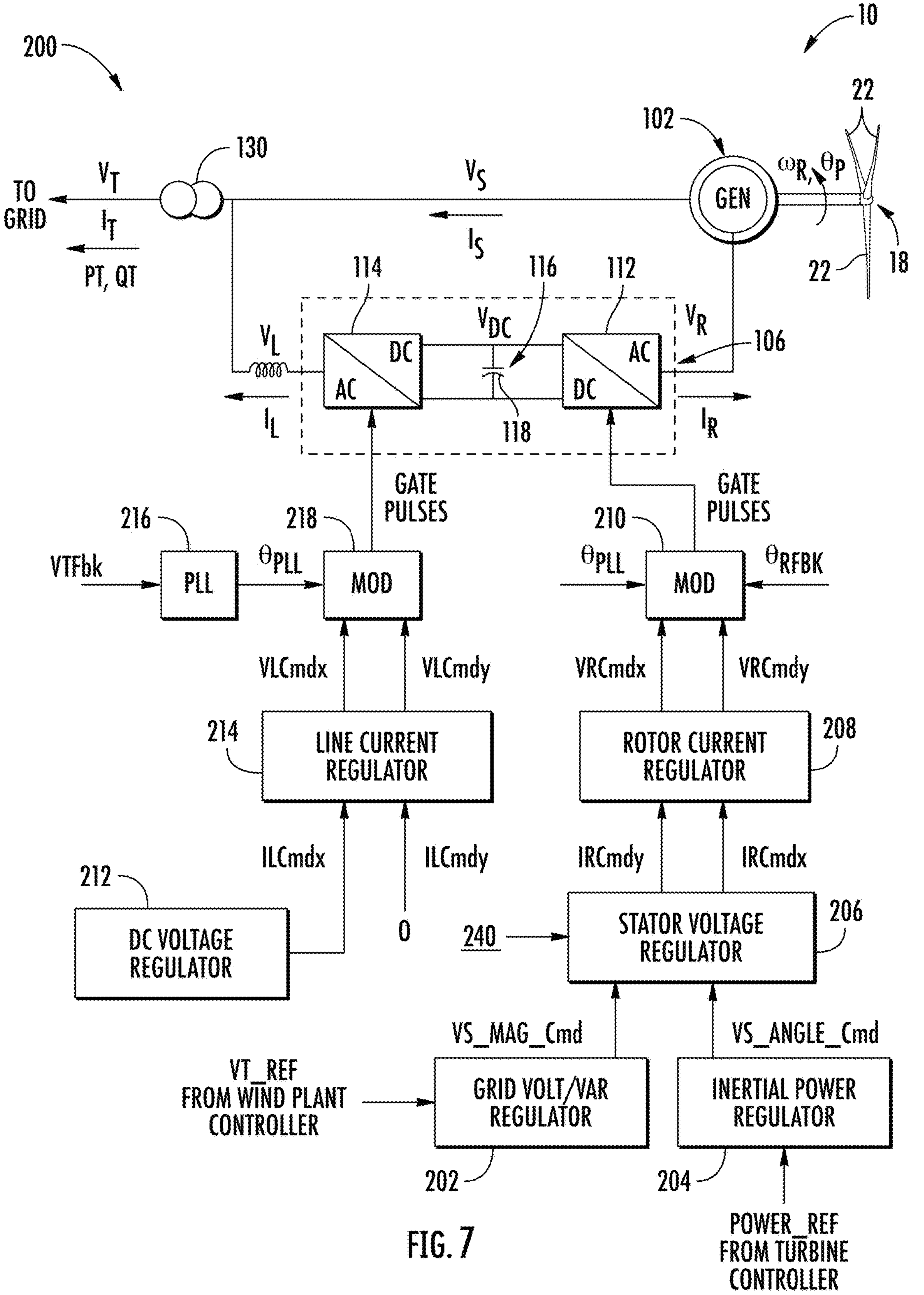
FIG. 7 illustrates a one-line diagram of an embodiment of a double-fed wind turbine generator with converter controls for grid-forming application according to the present disclosure.

Referring now to FIG. 7, a schematic diagram of an embodiment of a grid forming power system 200 according to the present disclosure, particularly illustrating a one-line diagram of the generator 102 with a high-level control structure for grid-forming characteristics. In particular, as shown, the grid forming power system 200 may include many of the same features of FIG. 4 described herein, with components having the same reference characters representing like components. Further, as shown, the grid forming power system 200 may include a control structure for controlling the line side converter that is similar to the control structure shown in FIG. 1. More particularly, as shown, the line side converter control structure may include a DC voltage regulator 212 and a line current regulator 214. The DC voltage regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the line side converter 114. The phase-locked loop 216 typically generates its output using a voltage feedback signal.

Furthermore, as shown, the grid forming power system 200 may also include a unique control structure for controlling the rotor side converter 112 using grid-forming characteristics. In particular, as shown in FIG. 7, the grid forming power system 200 may include a stator voltage regulator 206 for providing such grid-forming characteristics. In addition, as shown, the grid forming power system 200 may include a grid voltage/VAR regulator 202, an inertial power regulator 204, a rotor current regulator 208, and a modulator 210.

More particularly, the grid forming power system 200 includes an inner-loop current-regulator structure and a fast stator voltage regulator to convert voltage commands from the grid-forming controls to rotor current regulator commands. Thus, the system and method of the present disclosure provide control of the rotor voltage of the generator 102 to meet a higher-level command for magnitude and angle of stator voltage. Such control must be relatively fast and insensitive to current flowing in the stator of the generator 102.

Figure 8:
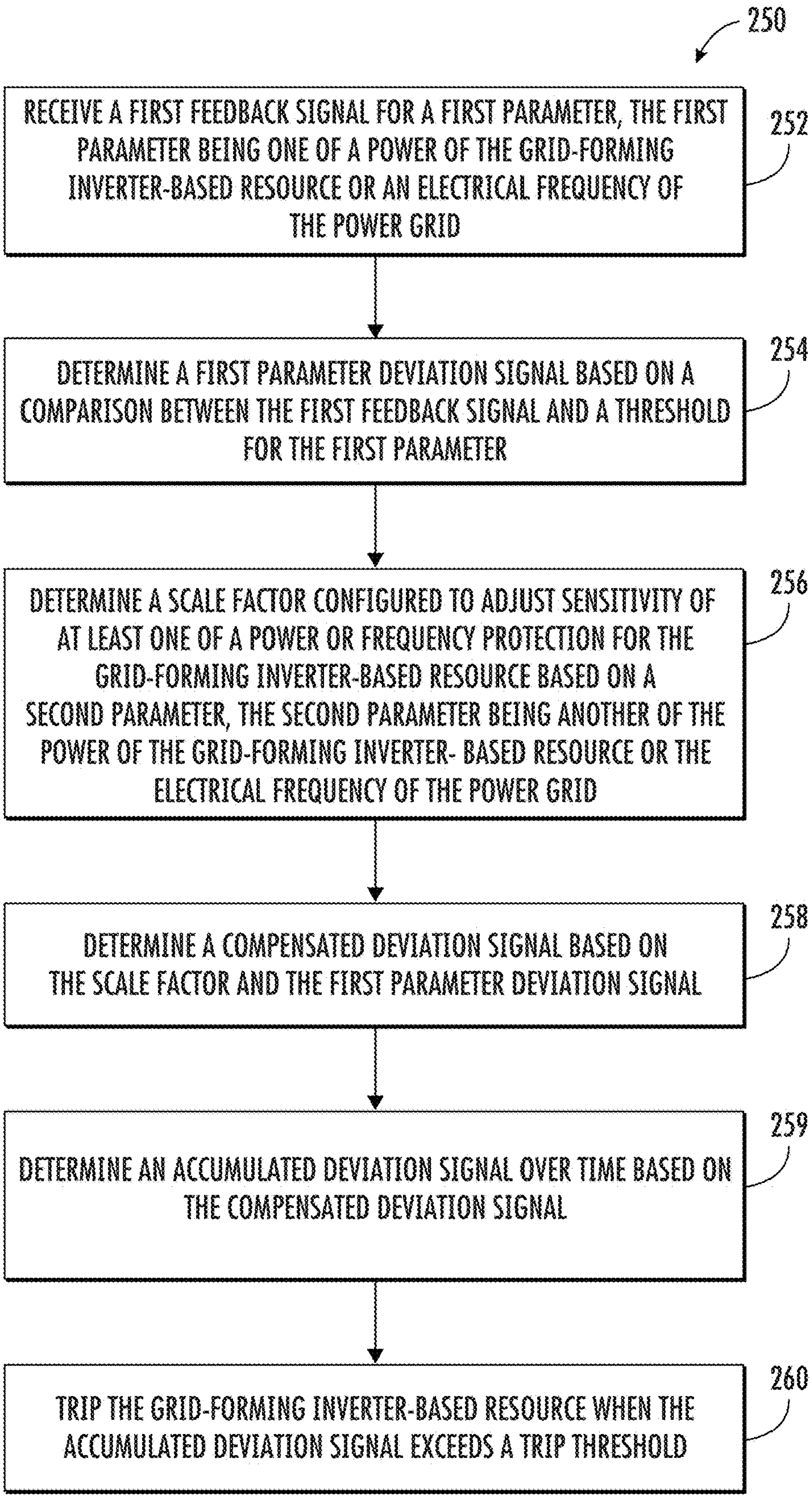
FIG. 8 illustrates a flow diagram of an embodiment of a method of protecting a grid-forming inverter-based resource from power deviations according to the present disclosure.

Referring now to FIGS. 8-11, the present disclosure is directed to a method 250 and a system 300, 400 for protecting a grid-forming inverter-based resource connected to a power grid from power deviations according to the present disclosure. In particular, FIG. 8 illustrates a flow diagram of an embodiment of a method 250 for protecting a grid-forming inverter-based resource connected to a power grid from power deviations according to the present disclosure. In general, the method 250 is described herein with reference to the wind turbine 10 and the wind farm 50 of FIGS. 2-7. However, it should be appreciated that the disclosed method 250 may be implemented with any inverter-based resources in addition to wind turbines having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (252), the method 250 includes determining (e.g., via a controller (such as the controller 26, the controller 56, or the controller 120) a first projected signal for a first parameter, the first parameter being one of a power of the grid-forming inverter-based resource and an electrical frequency of the power grid. In general, the method 250 is described herein with reference to the first parameter being the power of the grid-forming inverter-based resource. However, it should be appreciated that the disclosed method 250 may be implemented with the first parameter being the electrical frequency of the power grid. The first projected signal (also referred to herein as a "projected power signal") is determined based on a power feedback signal of the wind turbine 10, as explained below. The power feedback signal may be measured by one or more sensors 68 and/or determined by (e.g., according to known mathematical techniques) one or more controllers 26, 56, 120 (e.g., based on measurements received from the one or more sensors 68).

As shown at (254), the method 250 includes determining (e.g., via the controller) a first parameter deviation signal (also referred to herein as a "power deviation signal") based on a comparison between the projected power signal and a threshold for the first parameter (also referred to herein as a "power threshold"). In an embodiment, the power threshold may be a minimum operating power for the wind turbine 10 or a maximum operating power for the wind turbine 10, as explained below. Accordingly, the projected power signal is compared to one of the minimum operating power or the maximum operating power. Thus, the power deviation signal is a difference between the power threshold and the projected power signal.

As shown at (256), the method 250 includes determining (e.g., via the controller) a scale factor configured to adjust sensitivity of power protection based on a second parameter, the second parameter being another of the power of the grid-forming inverter-based resource and the electrical frequency of the power grid. In general, the method 250 is described herein with reference to the second parameter being the electrical frequency of the power grid. However, it should be appreciated that the disclosed method 250 may be implemented with the second parameter being power of the grid-forming inverter-based resource. In an embodiment, for example, the method 250 may include determining the scale factor by applying a gain to a second parameter deviation signal (also referred to herein as a "frequency deviation signal"). The frequency deviation signal may be determined based on a difference between a second projected signal (also referred to herein as a "projected frequency signal") and a threshold for the second parameter (also referred to herein as a "frequency threshold"). The projected frequency signal may be determined based on a frequency feedback signal or an estimated rate of change of frequency, as explained below. The frequency feedback signal may be measured by one or more sensors 68 and/or determined by (e.g., according to one or more known mathematical techniques) one or more controllers 26, 56, 120 (e.g., based on measurements received from the one or more sensors 68). A common method for obtaining frequency feedback is through measuring voltage and using the measured voltage feedbacks as inputs to a phase-locked loop (PLL) algorithm. In an embodiment, for example, the method 250 may include determining the scale factor is the frequency deviation signal. In an embodiment, the scale factor may be limited by a maximum scale factor and a minimum scale factor. Under normal frequency conditions, the scale factor may be largely close to one and therefore have little to no effect on the sensitivity of power protection.

Furthermore, in an embodiment, the frequency threshold specifies at least one of an upper parameter limit or a lower parameter limit, as explained below. For example, when the frequency threshold specifies a lower parameter limit, the resulting scaling factor only affects the power deviation signal if the projected power signal exceeds the maximum operating power. As another example, when the frequency threshold specifies an upper parameter limit, the resulting scaling factor only affects the power deviation signal if the projected power signal falls below the minimum operating power.

Referring still to FIG. 8, as shown at (258), the method 250 includes determining (e.g., via the controller) a compensated deviation signal for the wind turbine 10 based on the scale factor and the power deviation signal. In an embodiment, the compensated deviation signal may be determined by applying (e.g., via multiplication, addition, or any other suitable mathematical function) the scale factor to the power deviation signal. In an embodiment, an output may be obtained by applying (e.g., via multiplication) a gain to the power deviation signal, and the scale factor may be applied (e.g., via multiplication) to the output to obtain the compensated deviation signal. In an embodiment, the compensated deviation signal may be determined based on combining (e.g., via addition, multiplication, or any other suitable mathematical function) a first signal and a second signal. In such an embodiment, the first signal may be obtained by applying a gain and/or the scale factor to the power deviation signal (e.g., via multiplication). The second signal may be determined based on applying a further gain, an offset, and/or the scale factor to the power deviation signal. For example, the offset may be combined (e.g., via subtraction) with the power deviation signal to obtain an output. The further gain and the scale factor may then be combined (e.g., via multiplication) to the output to obtain the second signal.

Furthermore, in an embodiment, the first signal may be greater than or equal to a first signal limit. In an embodiment, the second signal may be greater than or equal to a second signal limit. The second signal limit may be greater than the first signal limit. For example, the first signal limit may be a real number having a negative value (i.e., less than zero), and the second signal limit may be zero. The first signal limit may specify a minimum first signal. The second signal limit may specify a minimum second signal. Thus, the first and second signal limits may be configured to provide a constraint on the compensated deviation signal to prevent insufficient sensitivity or over sensitivity to power tripping in response to power deviations.

Referring still to FIG. 8, as shown at (259), the method 250 includes accumulating the compensated deviation signal over time to determine an accumulated deviation signal. For example, the accumulated deviation signal may be a summation of compensated deviation signals over time. As another example, the accumulated deviation signal may be an amount of time over which scale factors affect corresponding power deviations signals, as described above.

Referring still to FIG. 8, as shown at (260), the method 250 includes tripping (e.g., via the controller) the inverter-based resource (i.e., the wind turbine 10) when the accumulated deviation signal exceeds a trip threshold. For example, in an embodiment, the trip threshold may specify a maximum of a power, energy, or time signal above which the wind turbine 10 is subjected to excessive equipment overloading. Thus, the trip threshold may be configured to provide a constraint on the accumulated deviation signal to prevent excess equipment overload in response to power deviations.

Figure 9:
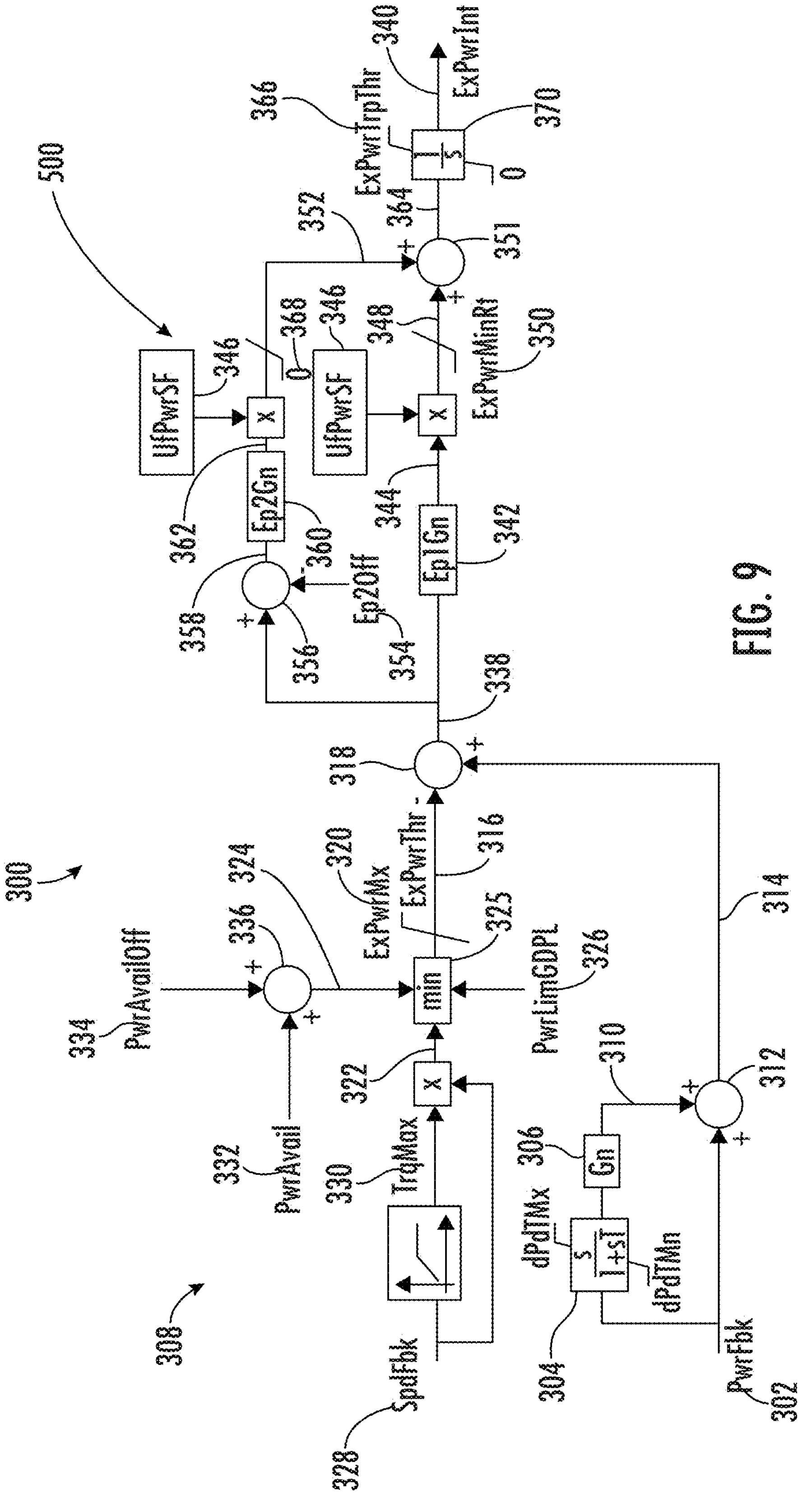
FIG. 9 illustrates a control diagram of an embodiment of a system for protecting a grid-forming inverter-based resource from power deviations according to the present disclosure.
Figure 10:
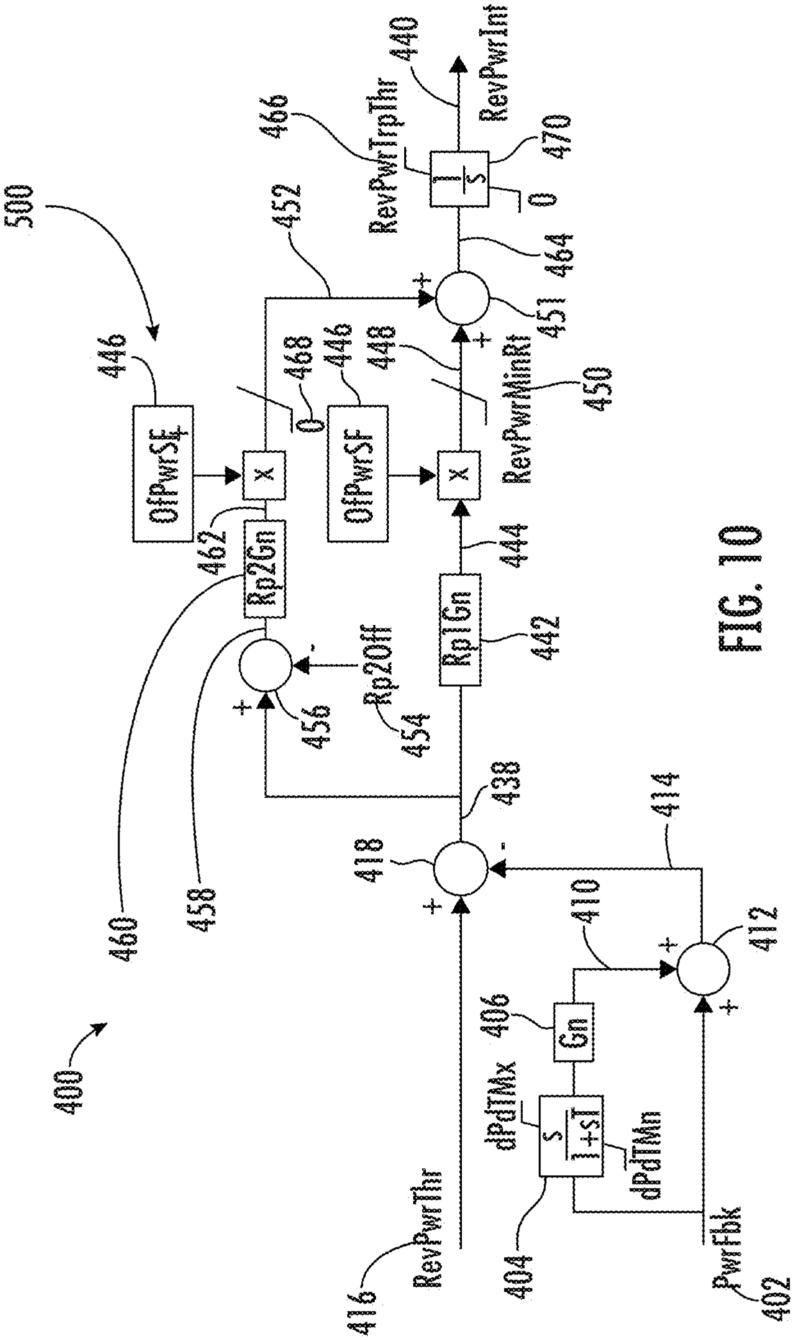
FIG. 10 illustrates a control diagram of another embodiment of a system for protecting a grid-forming inverter-based resource from power deviations according to the present disclosure.
Figure 11:
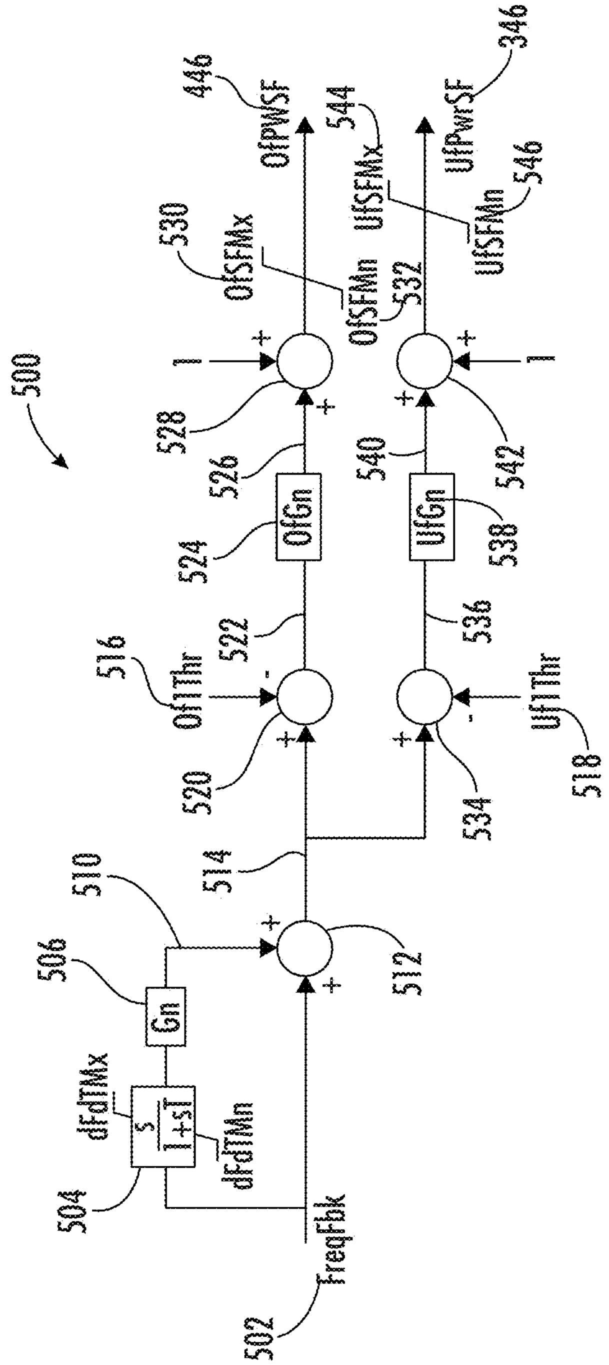
FIG. 11 illustrates a control diagram of an embodiment of a scale factor calculation module of a system for protecting a grid-forming inverter-based resource from power deviations according to the present disclosure.

The method 250 of FIG. 8 can be better understood with reference to FIGS. 9-11. In particular, FIGS. 9-11 illustrate schematic diagrams of the system 300, 400 for protecting a grid-forming inverter-based resource connected to a power grid from power deviations according to the present disclosure. More specifically, FIG. 9 illustrates a schematic diagram of an embodiment of protecting a grid-forming inverter-based resource from excessive power (e.g., caused by excessive loads in the electrical network that are likely to occur during blackstarting, islanding conditions, and/or other grid conditions where generation/load is not well balanced) according to the present disclosure. FIG. 10 illustrates a schematic diagram of an embodiment of protecting a grid-forming inverter-based resource from reverse power (e.g., caused by severe grid events under certain operating conditions, for example when a sudden trip of a large load in the system leads to excessive generation in the electrical network) according to the present disclosure. FIG. 11 illustrates a schematic diagram of an embodiment of a scale factor calculation module 500 of the system 300 according to the present disclosure. In general, the system 300, 400 is described herein with reference to the first parameter being the power of the grid-forming inverter-based resource and the second parameter being the electrical frequency of the power grid. That is, the system 300, 400 is described herein with reference to power protection with a scale factor to introduce frequency sensitivity. However, it should be appreciated that the disclosed system 300, 400 may be implemented with the first parameter being the electrical frequency of the power grid and the second parameter being the power of the grid-forming inverter-based resource. That is, the system 300, 400 may be implemented with reference to frequency protection with a scale factor to introduce power sensitivity.

As shown in the embodiment illustrated in FIG. 9, the system 300 may be configured to trip the wind turbine 10 in response to severe grid conditions where load exceeds available power. In this embodiment, the system 300 is configured to receive a power feedback signal 302 (e.g., PwrFbk) as input. The system 300 is configured to determine a projected power signal 314 based on the power feedback signal 302. More specifically, as shown, the system 300 is configured to filter the power feedback signal 302 via a filter stage 304 (e.g. a washout filter to estimate the rate of change of power) and then apply a gain 306 (e.g., via multiplication) to obtain an output 310 that reflects a projection of the power feedback at a future point in time. This projection in time of the power feedback can help reduce delays in the operation of the protection as the power is rapidly approaching or exceeding the power threshold. The output 310 and the power feedback signal 302 can then be summed, as shown at 312, to obtain the projected power signal 314. In another embodiment, the filter stage 304 and gain 306 can be omitted and the power feedback 314 would be the same as the power feedback signal 302.

The projected power signal 314 is then compared to a power threshold at comparator 318. In this embodiment, the power threshold is a maximum operating power 316 (e.g., ExPwrThr). In this embodiment, the maximum operating power 316 may be limited by a maximum power 320 (e.g., ExPwrMx). The maximum power 320 can be, for example, a maximum power that can be applied to the generator 24 via rotation of the rotor 18 so as to generate and provide electricity to the power grid without excessive equipment overloading.

In particular embodiments, as shown, the maximum operating power 316 is a variable power dependent on a speed-dependent maximum power 322, an available power 324 (e.g. available aerodynamic power from wind or available solar irradiance power), the maximum power 320, and/or a grid power limit 326 (e.g. a grid-dependent power limit (PwrLimGDPL)). In such an embodiment, a power threshold module 308 may be configured to determine the maximum operating power 316. For example, the power threshold module 308 may receive a plurality of inputs. In particular embodiments, as shown, the plurality of inputs may include, for example, a speed feedback signal 328 (e.g., SpdFbk), the grid power limit 326 (e.g., PwrLimGDPL), and a maximum expected available power signal 332 (e.g., PwrAvail). The power threshold module 308 may be configured to limit the maximum operating power 316 by the maximum power 320. In other words, the maximum power 320 may be configured as a constraint to the power to prevent excessive equipment overloading in the wind turbine 10 or components thereof.

Additionally, or alternatively, the power threshold module 308 may be configured to determine the maximum operating power 316 based on determining a minimum (e.g., via a minimum function 325) of the speed-dependent maximum power 322, the available power 324, and/or the grid power limit 326.

Furthermore, the speed-dependent maximum power 322 may be determined based on the speed feedback signal 328. For example, the power threshold module 308 may receive the speed feedback signal 328 and access a look-up table, or the like, that associates various maximum torques with various speed feedback signals. The power threshold module 308 can then select, from the look-up table, a maximum torque 330 (e.g., TrqMax) associated with the speed feedback signal 328. As shown, the power threshold module 308 can determine the speed-dependent power 322 by multiplying the speed feedback signal 328 and the selected maximum torque 330.

The available power 324 may be determined based on a wind speed. For example, the power threshold module 308 can access a look-up table, or the like, that associated various maximum expected powers with various wind speeds. The power threshold module 308 can then select, from the look-up table, the maximum available power 332 (e.g., PwrAvail) associated with the wind speed. Additionally, the power threshold module 308 can then combine (e.g., via summation or multiplication) an offset 334 (e.g., PwrOff) with the maximum available power 332, as shown at 336, to determine the available power 324.

The maximum available power 332 may be determined empirically (e.g., based on testing and/or simulation to determine maximum powers generated by various wind speeds). The offset 334 may be configured as a constraint to the maximum available power 332 to prevent an actual (e.g., measured) power from exceeding the maximum available power 332 (e.g., due to deviations in sensor performance and/or manufacturing tolerances). The wind speed may, for example, be measured by the sensor 66.

The grid power limit 326 may specify a maximum power that can be output from the wind turbine 10 to the power grid without excessively overloading the wind turbine or causing voltage stability issues. The grid power limit 326 may be computed as a function of a voltage feedback, a phase locked loop (PLL) error signal, or similar method.

In another embodiment, the maximum operating power 316 is a fixed power. In such an embodiment, the maximum operating power 316 may be the maximum power 320.

A power deviation signal 338 is output by the comparator 318. The system 300 can then determine an accumulated deviation signal 340 (e.g., ExPwrInt) based on the power deviation signal 338. More specifically, as shown in an embodiment, a gain 342 is applied (e.g., via multiplication) to the power deviation signal 338 to obtain an output 344. A scale factor 346 (e.g., UfPwrSF) is then applied (e.g., via multiplication, addition, or any other suitable mathematical function) to the output 344 to obtain a first signal 348. The system 300 may also be configured to compare the first signal 348 to a first signal limit 350 (e.g., ExPwrMinRt), as explained above. When the first signal 348 is less than the first signal limit 350, the system 300 is configured to set the first signal 348 to the first signal limit 350. Further, the system 300 is configured to determine an output 364 based on the first signal 348.

As shown, in an embodiment, the system 300 may be configured to combine (e.g., via a summator 351) the first signal 348 and a second signal 352 to determine a compensated deviation output 364. For example, the system 300 may be configured to apply an offset 354 (e.g., via a comparator 356) to the power deviation signal 338 to obtain an output 358. A further gain 360 may then be applied to the output 358 to obtain a further output 362. The scale factor 346 (e.g., UfPwrSF) is then also applied (e.g., via multiplication, addition, or any other suitable mathematical function) to the further output 362 to obtain the second signal 352. The system 300 may be configured to compare the second signal 352 to a second signal limit 368 (as explained above). When the second signal 352 is less than the second signal limit 368, the system 300 is configured to set the second signal 352 to the second signal limit 368. The gain 342, the further gain 360, and/or the offset 354 may be determined to adjust sensitivity of power tripping in response to excessive power.

In general, the present disclosure describes determining the compensated deviation 364 based on combining the first signal 348 and the second signal 352. However, it should be appreciated that the compensated deviation 364 can be determined based on combining the first and second signals 348, 352 with one or more additional signals. In such examples, the one or more additional signals may be determined in a similar manner as the determination of the second signal 352 (e.g., by applying respective offsets, respective gains, and the scale factor to the power deviation signal). As another example, it should be appreciated that the compensated deviation 364 can be equal to the first signal 348.

The system 300 is configured to integrate the compensated deviation 364 via an integrator 370 to obtain the accumulated deviation signal 340. The system 300 is further configured to provide a trip threshold 366 (e.g., ExPwrTrpThr) on the accumulated deviation signal 340. More specifically, the system 300 is configured to trip the wind turbine 10 when the accumulated deviation signal 340 exceeds the trip threshold 366. In the embodiment shown in FIG. 9A, the trip threshold 366 is configured to protect from excess equipment overload in conditions where the electrical loads exceed available power/energy or insufficient equipment capacity for serving the loads is connected within the network.

As shown in the embodiment illustrated in FIG. 10, the system 400 may be configured to trip the wind turbine 10 in response to reverse power. In this embodiment, the system 400 is configured to receive a power feedback signal 402 (e.g., PwrFbk) as input. The system 400 is configured to determine a projected power signal 414 based on the power feedback signal 402. More specifically, as shown, the system 400 is configured to filter the power feedback signal 402 via a filter stage 404 (e.g. a washout filter) and then apply a gain 306 (e.g., via multiplication) to obtain an output 310 that reflects a projection of the power feedback at a future point in time, as discussed above. The output 410 and the power feedback signal 402 can then be summed, as shown at 412, to obtain the projected power signal 414. In another embodiment, the filter stage 404 and gain 406 can be omitted and the power feedback 414 would be the same as the power feedback signal 402.

The projected power signal 414 is then compared to a power threshold at comparator 418. In this embodiment, the power threshold is a minimum operating power 416 (e.g., RevPwrThr). The projected power signal 414 is compared to the minimum operating power 416 (i.e., the power threshold) at the comparator 418. That is, the power threshold is the minimum operating power 416. The minimum operating power 417 may be a minimum reverse (negative) power that can flow in the opposite direction of normal power flow before the turbine might experience damage and/or other adverse consequences. In an embodiment, the minimum operating power 417 is a fixed power. The minimum operating power 417 may be determined based on various design parameters of the wind turbine 10 and/or components thereof.

A power deviation signal 438 is output by the comparator 418. The system 400 is configured to determine an accumulated deviation signal 440 (e.g., RevPwrInt) based on the power deviation signal 438. More specifically, as shown in an embodiment, a gain 442 is applied to the power deviation signal 438 to obtain an output 444. A scale factor 446 (e.g., OfPwrSF) is then applied (e.g., via multiplication) to the output 444 to obtain a first signal 448. The system 400 may be configured to compare the first signal 448 to a first signal limit 450 (e.g., RevPwrMinRt) (as explained above). When the first signal 448 is less than the first signal limit 450, the system 400 is configured to set the first signal 448 to the first signal limit 450. The system 400 is also configured to determine a compensated deviation 464 based on the first signal 448.

As shown, in an embodiment, the system 400 may be configured to combine (e.g., via a summator 351) the first signal 448 and a second signal 452 to determine the compensated deviation 464. The system 400 may also be configured to apply an offset 454 (e.g., Rp2Off) via a comparator 456 to the power deviation signal 438 to obtain an output 458. A further gain 460 may then be applied to the output 458 to obtain a further output 462. The scale factor 446 is then applied (e.g., via multiplication, addition, or any other suitable mathematical function) to the further output 462 to obtain the second signal 452. The system 400 may be configured to compare the second signal 452 to a second signal limit 468 (as explained above). When the second signal 452 is less than the second signal limit 468, the system 400 is configured to set the second signal 452 to the second signal limit 468. The gain 442, the further gain 460, and/or the offset 454 may be determined to adjust sensitivity of power tripping in response to reverse power.

In general, the present disclosure describes determining the compensated deviation 464 based on combining the first signal 448 and the second signal 452. However, it should be appreciated that the compensated deviation 464 can be determined based on combining the first and second signals 448, 452 with one or more additional signals. In such examples, the one or more additional signals may be determined in a similar manner as the determination of the second signal 452 (e.g., by applying respective offsets, respective gains, and the scale factor to the power deviation signal). As another example, it should be appreciated that the compensated deviation 464 can be equal to the first signal 448.

The system 400 is also configured to integrate the compensated deviation 464 via an integrator 470 to obtain the accumulated deviation signal 440. The system 400 is further configured to provide a trip threshold 466 (e.g., RevPwrTrpThr) on the accumulated deviation signal 440. The system 400 is configured to trip the wind turbine 10 when the accumulated deviation signal 440 exceeds the trip threshold 466. In the embodiment shown in FIG. 10, the trip threshold 466 is configured to provide a constraint on the power to prevent excess equipment overload in response to reverse power.

Details of the calculation of the scale factor(s) 346, 446 according to an exemplary embodiment described herein are illustrated in FIG. 10. In particular, as shown, a schematic diagram of an embodiment of a scale factor calculation module 500 of the system 300 according to the present disclosure is illustrated. The scale factor calculation module 500 is configured to determine the scale factor(s) 346, 446 based on a frequency feedback signal 502 (e.g., FreqFbk) from the power grid. In this embodiment, the scale factor calculation module 500 filters the frequency feedback signal 502 via a filter stage 504 (e.g., a washout to determine the rate of change of frequency) and then applies a gain 506 (e.g., via multiplication) to obtain an output 510 that reflects a projection of the frequency at a future point in time. The output 510 and the frequency feedback signal 502 can then be summed, as shown at 512, to obtain a projected frequency signal 514. In another embodiment, the filter stage 504 and gain 504 can be omitted and the frequency feedback 514 would be the same as the frequency feedback signal 502.

The projected frequency signal 514 is then compared to a frequency threshold 516, 518 to determine the scale factor 346, 446. The frequency threshold specifies one of an upper frequency limit 516 (e.g., Of1Thr) and a lower frequency limit 518 (e.g., Uf1Thr). The upper frequency limit 516 may be a maximum frequency of the power grid, and the lower frequency limit 518 may be a minimum frequency of the power grid. The upper frequency limit 516 and the lower frequency limit 518 may be determined empirically (e.g., based on testing and/or simulation data to determine various frequencies of the power grid in various operating conditions).

More specifically, the projected frequency signal 514 is compared to the upper frequency limit 516 at comparator 520 to determine the scale factor 446. That is, the scale factor calculation module 500 is configured to determine a difference 522 between the projected frequency signal 514 and the upper frequency limit 516. A gain 524 is then applied (e.g., via multiplication) to the difference 522 to obtain an output 526. As shown at summator 528, an offset is added to the output 526 to obtain the scale factor 446. The offset may have any suitable specified value (e.g., an integer having a value of 1, as shown in FIG. 10), and may be specified to influence changes in the scale factor in response to frequency deviations. The scale factor calculation module 500 may also provide maximum and minimum scale factor limits 530, 532 (e.g., OfSFMx, OfSFMn) on the scale factor 446. Thus, the scale factor limits 530, 532 are configured to provide a constraint on the scale factor 446 to prevent insufficient or excessive sensitivity of power tripping in response to reverse power.

Furthermore, the projected frequency signal 514 is compared to the lower frequency limit 518 at comparator 534 to determine the scale factor 346. That is, the scale factor calculation module 500 is configured to determine a difference 536 between the projected frequency signal 514 and the lower frequency limit 518. A gain 538 is then applied (e.g., via multiplication) to the difference 536 to obtain an output 540. As shown at summator 542, an offset (e.g., an integer having a value of 1, as shown in FIG. 10) is added to the output 540 to obtain the scale factor 346. The scale factor calculation module 500 may also provide maximum and minimum scale factor limits 544, 546 (e.g., UfSFMx, UfSFMn) on the scale factor 346. Thus, the scale factor limits 544, 546 are configured to provide a constraint on the scale factor 346 to prevent insufficient or excessive sensitivity of power tripping in response to excessive power.

In an alternative embodiment, the scale factor 346, 446 may be determined equal to one of the frequency deviation signal and the power deviation signal.

Further aspects of the invention are provided by the subject matter of the following clauses:

A method for protecting a grid-forming inverter-based resource connected to a power grid from power deviations, the method comprising: receiving a first feedback signal for a first parameter, the first parameter being one of a power of the grid-forming inverter-based resource or an electrical frequency of the power grid; determining a first parameter deviation signal based on a comparison between the first feedback signal and a threshold for the first parameter; determining a scale factor configured to adjust sensitivity of at least one of a power or frequency protection for the grid-forming inverter-based resource based on a second parameter, the second parameter being another of the power of the grid-forming inverter-based resource or the electrical frequency of the power grid; determining a compensated deviation signal based on the scale factor and the first parameter deviation signal; determining an accumulated deviation signal over time based on the compensated deviation signal; and tripping the grid-forming inverter-based resource when the accumulated deviation signal exceeds a trip threshold.

The method of any preceding clause, wherein determining the scale factor based on the second parameter further comprises: receiving a second feedback signal for the second parameter; determining a second parameter deviation signal based on a difference between the second feedback signal and a threshold for the second parameter; and determining the scale factor based on the second parameter deviation signal.

The method of any preceding clause, wherein the scale factor is limited by a maximum scale factor and a minimum scale factor.

The method of any preceding clause, wherein the threshold for the second parameter is one of an upper parameter limit or a lower parameter limit for the second parameter.

The method of any preceding clause, wherein determining the scale factor based on the second parameter deviation signal further comprises: obtaining an output after applying a gain to the second parameter deviation signal; and adding an offset to the output to determine the scale factor.

The method of any preceding clause, wherein determining the compensated deviation signal based on the scale factor and the first parameter deviation signal further comprises: applying the scale factor to the first parameter deviation signal to determine the compensated deviation signal.

The method of any preceding clause, wherein applying the scale factor to the first parameter deviation signal to determine the compensated deviation signal further comprises: applying a gain to the first parameter deviation signal prior to obtain an output; and applying the scale factor to the output to obtain the compensated deviation signal.

The method of any preceding clause, wherein determining the compensated deviation signal based on the scale factor and the first parameter deviation signal further comprises: determining a first signal based on applying a gain and the scale factor to the first parameter deviation signal; determining a second signal based on applying a further gain, an offset, and the scale factor to the first parameter deviation signal; and determining the compensated deviation signal based on combining the first signal and the second signal.

The method of any preceding clause, wherein the first signal is greater than or equal to a first signal limit, and the second signal is greater than or equal to a second signal limit, the second signal limit being greater than the first signal limit.

The method of any preceding clause, wherein the threshold for the first parameter is one of a minimum value or a maximum value for the first parameter.

The method of any preceding clause, wherein the accumulated deviation signal is one of a time, energy, or angle.

A wind farm, the wind farm comprising: a plurality of wind turbines capable of being connected to a power grid via a transmission network; and a controller comprising at least one processor, the at least one processor configured to perform a plurality of operations, the plurality of operations comprising: receiving a first feedback signal for a first parameter, the first parameter being one of a power of the grid-forming inverter-based resource or an electrical frequency of the power grid; determining a first parameter deviation signal based on a comparison between the first feedback signal and a threshold for the first parameter; determining a scale factor configured to adjust sensitivity of at least one of a power or frequency protection for the grid-forming inverter-based resource based on a second parameter, the second parameter being another of the power of the grid-forming inverter-based resource or the electrical frequency of the power grid; determining a compensated deviation signal based on the scale factor and the first parameter deviation signal; determining an accumulated deviation signal over time based on the compensated deviation signal; and tripping the grid-forming inverter-based resource when the accumulated deviation signal exceeds a trip threshold.

The wind farm of any preceding clause, wherein determining the scale factor based on the second parameter further comprises: determining a second feedback signal for the second parameter; determining a second parameter deviation signal based on a difference between the second feedback signal and a threshold for the second parameter; and determining the scale factor based on the second parameter deviation signal.

The wind farm of any preceding clause, wherein the scale factor is limited by a maximum scale factor and a minimum scale factor.

The wind farm of any preceding clause, wherein the threshold for the second parameter is one of an upper parameter limit or a lower parameter limit for the second parameter.

The wind farm of any preceding clause, wherein determining the scale factor based on the second parameter deviation signal further comprises: obtaining an output after applying a gain to the second parameter deviation signal; and adding an offset to the output to determine the scale factor.

The wind farm of any preceding clause, wherein determining the compensated deviation signal based on the scale factor and the first parameter deviation signal further comprises: applying the scale factor to the first parameter deviation signal to determine the compensated deviation signal.

The wind farm of any preceding clause, wherein applying the scale factor to the first parameter deviation signal to determine the compensated deviation signal further comprises: applying a gain to the first parameter deviation signal prior to obtain an output; and applying the scale factor to the output to obtain the compensated deviation signal.

The wind farm of any preceding clause, herein determining the compensated deviation signal based on the scale factor and the first parameter deviation signal further comprises: determining a first signal based on applying a gain and the scale factor to the first parameter deviation signal; determining a second signal based on applying a further gain, an offset, and the scale factor to the first parameter deviation signal; and determining the compensated deviation signal based on combining the first signal and the second signal.

The wind farm of any preceding clause, wherein the first signal is greater than or equal to a first signal limit, and the second signal is greater than or equal to a second signal limit, the second signal limit being greater than the first signal limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting a grid-forming inverter-based resource connected to a power grid from power deviations, the method comprising:

receiving a first feedback signal for a first parameter, the first parameter being one of a power of the grid-forming inverter-based resource or an electrical frequency of the power grid;

determining a first parameter deviation signal based on a comparison between the first feedback signal and a threshold for the first parameter;

determining a scale factor configured to adjust sensitivity of at least one of a power or frequency protection for the grid-forming inverter-based resource based on a second parameter, the second parameter being another of the power of the grid-forming inverter-based resource or the electrical frequency of the power grid;

determining a compensated deviation signal based on the scale factor and the first parameter deviation signal;

determining an accumulated deviation signal over time based on the compensated deviation signal; and tripping the grid-forming inverter-based resource when the accumulated deviation signal exceeds a trip threshold.

2. The method of claim 1, wherein determining the scale factor based on the second parameter further comprises:

receiving a second feedback signal for the second parameter;

determining a second parameter deviation signal based on a difference between the second feedback signal and a threshold for the second parameter; and determining the scale factor based on the second parameter deviation signal.

3. The method of claim 2, wherein the scale factor is limited by a maximum scale factor and a minimum scale factor.

4. The method of claim 2, wherein the threshold for the second parameter is one of an upper parameter limit or a lower parameter limit for the second parameter.

5. The method of claim 2, wherein determining the scale factor based on the second parameter deviation signal further comprises:

obtaining an output after applying a gain to the second parameter deviation signal; and adding an offset to the output to determine the scale factor.

6. The method of claim 1, wherein determining the compensated deviation signal based on the scale factor and the first parameter deviation signal further comprises:

applying the scale factor to the first parameter deviation signal to determine the compensated deviation signal.

7. The method of claim 6, wherein applying the scale factor to the first parameter deviation signal to determine the compensated deviation signal further comprises:

applying a gain to the first parameter deviation signal prior to obtain an output; and applying the scale factor to the output to obtain the compensated deviation signal.

8. The method of claim 1, wherein determining the compensated deviation signal based on the scale factor and the first parameter deviation signal further comprises:

determining a first signal based on applying a gain and the scale factor to the first parameter deviation signal;

determining a second signal based on applying a further gain, an offset, and the scale factor to the first parameter deviation signal; and determining the compensated deviation signal based on combining the first signal and the second signal.

9. The method of claim 8, wherein the first signal is greater than or equal to a first signal limit, and the second signal is greater than or equal to a second signal limit, the second signal limit being greater than the first signal limit.

10. The method of claim 1, wherein the threshold for the first parameter is one of a minimum value or a maximum value for the first parameter.

11. The method of claim 1, wherein the accumulated deviation signal is one of a time, energy, or angle.

12. A wind farm, the wind farm comprising:

a plurality of wind turbines capable of being connected to a power grid via a transmission network; and a controller comprising at least one processor, the at least one processor configured to perform a plurality of operations, the plurality of operations comprising:

receiving a first feedback signal for a first parameter, the first parameter being one of a power of the grid-forming inverter-based resource or an electrical frequency of the power grid;

determining a first parameter deviation signal based on a comparison between the first feedback signal and a threshold for the first parameter;

determining a scale factor configured to adjust sensitivity of at least one of a power or frequency protection for the grid-forming inverter-based resource based on a second parameter, the second parameter being another of the power of the grid-forming inverter-based resource or the electrical frequency of the power grid;

determining a compensated deviation signal based on the scale factor and the first parameter deviation signal;

determining an accumulated deviation signal over time based on the compensated deviation signal; and tripping the grid-forming inverter-based resource when the accumulated deviation signal exceeds a trip threshold.

13. The wind farm of claim 12, wherein determining the scale factor based on the second parameter further comprises:

determining a second feedback signal for the second parameter;

determining a second parameter deviation signal based on a difference between the second feedback signal and a threshold for the second parameter; and determining the scale factor based on the second parameter deviation signal.

14. The wind farm of claim 13, wherein the scale factor is limited by a maximum scale factor and a minimum scale factor.

15. The wind farm of claim 13, wherein the threshold for the second parameter is one of an upper parameter limit or a lower parameter limit for the second parameter.

16. The wind farm of claim 13, wherein determining the scale factor based on the second parameter deviation signal further comprises:

obtaining an output after applying a gain to the second parameter deviation signal; and adding an offset to the output to determine the scale factor.

17. The wind farm of claim 12, wherein determining the compensated deviation signal based on the scale factor and the first parameter deviation signal further comprises:

applying the scale factor to the first parameter deviation signal to determine the compensated deviation signal.

18. The wind farm of claim 17, wherein applying the scale factor to the first parameter deviation signal to determine the compensated deviation signal further comprises:

applying a gain to the first parameter deviation signal prior to obtain an output; and applying the scale factor to the output to obtain the compensated deviation signal.

19. The wind farm of claim 12, wherein determining the compensated deviation signal based on the scale factor and the first parameter deviation signal further comprises:

determining a first signal based on applying a gain and the scale factor to the first parameter deviation signal;

determining a second signal based on applying a further gain, an offset, and the scale factor to the first parameter deviation signal; and determining the compensated deviation signal based on combining the first signal and the second signal.

20. The wind farm of claim 19, wherein the first signal is greater than or equal to a first signal limit, and the second signal is greater than or equal to a second signal limit, the second signal limit being greater than the first signal limit.

* * * * *